United States Patent
Galloway (10) Patent No.: US 9,426,978 B1
(45) Date of Patent: Aug. 30, 2016

(54) BACKPACK HUNTING BLIND (71) Applicant: HARD CORE BRANDS INTERNATIONAL LLC, Ottawa, IL (US)

(72) Inventor: Michael James Galloway, Chardon, OH (US)

(73) Assignee: Hard Core Brands International LLC, Ottawa, IL (US)

( * ) Notice: Subject to any disclaimer, the term of this patent is extended or adjusted under 35 U.S.C. 154(b) by 253 days.

(21) Appl. No.: 14/204,325

(22) Filed: Mar. 11, 2014

Related U.S. Application Data (60) Provisional application No. 61/780,140, filed on Mar. 13, 2013.

(51) Int. Cl.
*A45F 3/04* (2006.01)
*A45C 15/00* (2006.01)
*A45C 9/00* (2006.01)
*A01M 31/02* (2006.01)
*A45F 4/04* (2006.01)
*A45F 3/08* (2006.01)
*A45F 4/02* (2006.01)

(52) U.S. Cl.
CPC .............. *A01M 31/025* (2013.01); *A45C 9/00* (2013.01); *A45F 3/04* (2013.01); *A45F 3/08* (2013.01); *A45F 4/02* (2013.01); *A45F 4/04* (2013.01)

(58) Field of Classification Search
CPC .............. A45F 4/04; A45F 3/08; A45F 3/04; A45F 4/02
USPC ......... 224/154, 153, 576, 577; 43/1; 135/95, 135/96
See application file for complete search history.

(56) References Cited

U.S. PATENT DOCUMENTS

| | | | | |
|---|---|---|---|---|
| 3,045,261 A | * | 7/1962 | Hocherman | A45F 4/06 190/2 |
| 3,619,827 A | * | 11/1971 | Mackenzie | E04H 15/324 135/156 |
| 4,581,837 A | * | 4/1986 | Powlus | A01M 31/025 428/16 |
| 4,751,936 A | * | 6/1988 | Zibble | A01M 31/025 135/117 |
| 5,016,792 A | * | 5/1991 | Jay | A47C 4/52 224/153 |
| 5,588,570 A | * | 12/1996 | Zirbel | A45F 4/02 224/155 |
| 5,647,159 A | * | 7/1997 | Latschaw | E04H 15/001 135/157 |
| 5,785,219 A | * | 7/1998 | Kraft | A45F 4/02 2/66 |
| 5,822,906 A | * | 10/1998 | Ward | A01M 31/025 135/901 |

(Continued)

*Primary Examiner* — Justin Larson
*Assistant Examiner* — Lester L Vanterpool
(74) *Attorney, Agent, or Firm* — Rankin, Hill & Clark LLP (57) ABSTRACT

A portable layout hunting blind that easy to transport and deploy in the field that includes a frame having a back frame portion and a base frame portion attached relative to the back frame to form a generally L-shaped frame configuration, the distal ends of the back and base frames configured to rest on the ground to form a slanted back support to produce a layout hunting blind when in a deployed condition, the backpack assembly further including a bag portion having an inner bag side adjacent the back frame and a bottom side adjacent the base frame wherein the frame is a backpack frame when in a transportable condition, the backpack assembly further including a pair of shoulder straps extending along the slanted back support to carry the backpack blind and a covering blind configured to lay over the hunter when in the deployed condition.

13 Claims, 7 Drawing Sheets

(56) References Cited

U.S. PATENT DOCUMENTS

| | | | | |
|---|---|---|---|---|
| 5,887,539 A * | 3/1999 | Rex | A01M 31/00 | 114/351 |
| 5,927,581 A * | 7/1999 | Reddy | A45F 3/02 | 224/153 |
| 5,941,264 A * | 8/1999 | Gregg | E04H 15/001 | 135/116 |
| 6,062,446 A * | 5/2000 | Daneau | A45F 4/06 | 135/95 |
| 6,154,904 A * | 12/2000 | Ehredt | A45C 3/10 | 5/639 |
| 6,543,072 B2 * | 4/2003 | Hsu | A47G 9/086 | 5/413 R |
| 6,547,110 B2 * | 4/2003 | O'Hare | A45F 3/08 | 224/155 |
| 6,694,995 B1 * | 2/2004 | Ransom | A01M 31/025 | 135/128 |
| 6,698,131 B2 * | 3/2004 | Latschaw | A01M 31/025 | 43/1 |
| 7,058,997 B1 * | 6/2006 | Klinger | A47G 9/086 | 190/18 A |
| 7,118,172 B1 * | 10/2006 | Pattison-Sheets | A45F 4/02 | 224/155 |
| 7,237,283 B2 * | 7/2007 | Devries | A47C 21/022 | 135/901 |
| D572,371 S * | 7/2008 | Desouche | D25/16 | |
| 7,438,078 B2 * | 10/2008 | Woodruff | E04H 15/02 | 135/96 |
| 7,549,434 B2 | 6/2009 | Bean | | |
| 8,727,190 B2 * | 5/2014 | Blair | A45F 4/02 | 135/95 |
| 2004/0000084 A1 * | 1/2004 | Latschaw | A01M 31/025 | 43/1 |
| 2004/0231221 A1 * | 11/2004 | Latschaw | A01M 31/025 | 43/1 |
| 2007/0012735 A1 * | 1/2007 | Lee | A45F 3/08 | 224/155 |
| 2007/0061966 A1 * | 3/2007 | Seth | A47G 9/086 | 5/413 R |
| 2007/0221261 A1 * | 9/2007 | Bean | E04H 15/001 | 135/143 |
| 2008/0061093 A1 * | 3/2008 | Pottharst | A45C 11/20 | 224/155 |
| 2013/0228600 A1 * | 9/2013 | Teixeira | A47G 9/086 | 224/156 |

* cited by examiner

BACKPACK HUNTING BLIND

This application claims priority in provisional patent application Ser. No. 61/780,140 that was filed on Mar. 13, 2013, which is incorporated by reference herein.

The invention of this application relates to hunting blinds and, more particularly, to a compact and easy to transport hunting blind that can be worn on the user's back and carry supplies, such as decoys used for hunting.

BACKGROUND OF THE INVENTION

Hunting blinds have been known in the industry for many years and have been found to be effective to allow hunters to hide themselves from the game being hunted. However, prior art hunting blinds have been found to be difficult to transport into the field and even more difficult to assemble in the field. Further, hunting blinds are often heavy and can be difficult to transport into the field with the supplies needed for hunting.

LAYOUT HUNTING BLINDS

More recently, a new hunting blind design has been introduced into this industry wherein the hunter is either sitting or laying within the blind and shoots from the top side of the blind. This differs from earlier designs wherein the blinds were taller and often one-sided wherein the hunter would shoot over or through the side surface of the hunting blind. While these have been found to effective, they are often difficult to transport into the field and often prevent the hunter from carrying other supplies into the filed, such as decoys.

While steps have been taken to improve the structures of these hunting blinds, the prior art designs are still bulking, heavy and often prevent the hunter from easily carry other supplies into the field. Yet further, the prior art frame structures are difficult to assemble in the field.

As a result, while the lay-out style hunting blind has been found to be very effective in the field, prior art designs are difficult to transport and limit the supplies that can be taken into the field without help or the use of motorized vehicles.

INCORPORATION BY REFERENCE

Many of these inferiorities found in the prior art are shown in several prior art patents which are all incorporated by reference into this application for what they show. The patent to Zibble, et al., U.S. Pat. No. 4,751,936, discloses a portable field blind that is a layout-style blind wherein the opening flips lengthways relative to the length of the layout blind and which includes a complicated frame structure. Latshaw U.S. Pat. No. 5,647,159 discloses a portable hunting blind with a slidable opening top. As with the Zibble patent, Latshaw discloses a complicated frame structure and a complicated lid sliding structure. Rex, et al., U.S. Pat. No. 5,887,539 discloses a boat-mounted blind. Ransom U.S. Pat. No. 6,694,995 discloses a layout hunting blind utilizing a looped frame structure to deploy the hunting blind in the field. Latshaw U.S. Pat. No. 6,698,131 discloses a collapsible layout hunting blind that includes a frame structure referenced above that utilizes structural characteristics that are difficult to deploy in the field and which are structurally inadequate. Devries U.S. Pat. No. 7,237,283 discloses a layout-style hunting blind that has a minimal frame configuration. Bean U.S. Pat. No. 7,549,434 discloses a portable hunting blind that utilizes a complicated frame structure as is discussed above in the background of the invention. All of these patents are hereby incorporated by reference into this application as background material.

SUMMARY OF THE INVENTION

The invention of this application relates to a hunting blind and, more particularly, to a backpack layout-style hunting blind that can also be used to transport supplies.

Yet further, the invention of this application relates to a frame configuration that is effective in creating both a layout blind and backpack that can transport supplies into the field. The resulting structure is also light weight and easily deployed in less than a minute, and able to be stored in a very compact configuration.

More particularly, the hunting blind of the invention of this application utilizes a frame structure that has a general L-shaped configuration wherein one set of legs of the L-shaped frame includes back bars and the other set of legs of the L-shaped frame includes base bars. The blind further includes a padded flap portion.

When deployed as a hunting blind, the back bars and base bars form a back rest for the hunter and the padded flap provides a cushioned layout pad for the hunter's buttocks, hips and thighs. But, when in the transport mode, the back bars and base bars form a backpack frame structure and the flap can be used to close off a bag portion of the backpack.

According to one aspect of the invention of this application, provided is a frame structure wherein the base bars and the back bars are pivotably attached to one another such that the layout blind can be compactly stored when not in use.

According to another aspect of the invention of this application, provided is a frame structure that extends along the sides of the back portion such that the blind produces a back rest portion that floats between the bars increasing comfort when used as a blind and when used to transport the blind into the field.

According to other aspects of the invention of this application, provided is a frame structure that can be selectively removable from the fabric layers of the backpack to allow the fabric layers to be more easily cleaned, stored and/or dried.

According to further aspects, at least some parts of the bag portions include evaporation or drainage features for wet objects placed in the bag.

According to even yet a further aspect of the present invention, provided is a large bag structure or portion mounted to the frame structure that can be used to transport supplies including decoys for hunting.

According to a further aspect of the invention of this application, provided is a separate cover or blind portion that can be transported and/or stored within the bag structure and easily deployed over the hunter in the field to produce the "blind" portion of the hunting blind of this application. Thus, the backpack and frame structure provide the support for the hunter and the separate cover provides the "blind" portion for the hunter.

According to yet further aspects of the present invention, the cover can include a viewable opening on the head end of the cover and/or a foot bag on the opposite or foot end. Yet further, the foot back can include a selectively openable section to allow the foot bag to be easily cleaned out after use and the viewable opening can be a meshed-style viewable opening. Yet further, the viewable opening can include an outer wire that allows the opening to be selectively deformable to allow the hunter to modify the shape of the opening.

According to yet another aspect of the invention of this application, the layout blind can be formed by a combination of waterproof materials and non-waterproof materials. In this respect, the padded flap portion can be made from waterproof materials and the back portion and/or blind portion can be formed from materials that breathe to help reduce heat buildup on the hunter's back within the hunting blind for use over extended periods of time.

According to even yet further aspects of the invention of this application, the layout blind can include one or more separate blinds such that the hunter can utilized different blind patterns (such as different camouflage patterns) for different hunting environments. These different environments can be different patterns for different seasons and/or geographic locations. Yet further, the blind portion and patterns for use in cold climates can include an insulating layer to keep the hunter warm and/or include provisions to secure an insulating layer to the blind structure. This can also include a blind structure that is waterproof to keep the hunter dry in rainy conditions.

These and other aspects, objects, features and advantages of the invention will become more apparent to those skilled in the art upon the reading of the description of the invention set forth below taken together with the drawings and pictures which will be described in the next section.

BRIEF DESCRIPTION OF THE DRAWINGS

The invention may take physical form in certain parts and arrangements of parts, a preferred embodiment or embodiments which will be described in detail and illustrated in the accompany drawings and attachments which form a part hereof and wherein.

DESCRIPTION OF PREFERRED EMBODIMENTS

With reference to figures of this application, shown is a layout hunting blind 10 of this application. More particularly, shown is hunting blind 10 that includes two primary components of the hunting blind of this application, namely, a backpack assembly 20 and a blind or cover portion 30. The blind portion is a cover that is configured to cover the hunter's body when the hunter is in a laying position on the backpack portion.

Backpack assembly 20 is generally formed from a backpack frame structure 40, a bag portion 50 and a padded flap 60 that can forms a layout pad for the layout blind to help keep the hunter dryer and/or cleaner.

Figure 13:
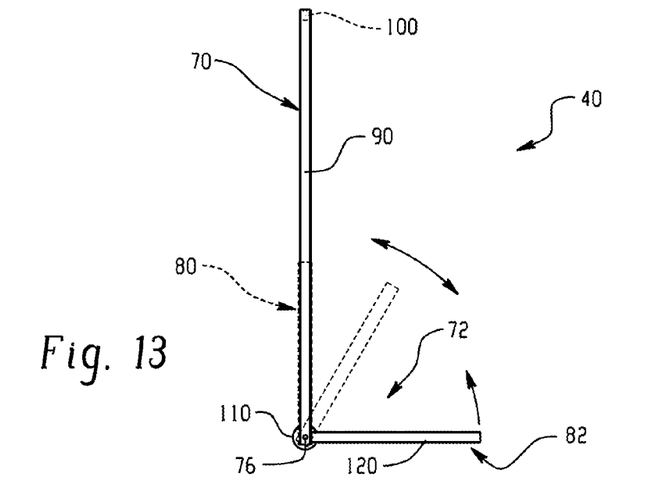
FIG. 13 is a side elevational view of a backpack frame structure shown in the folded and unfolded conditions; and, FIG. 14 is a top view of the of the backpack portion shown in a transportable condition and with the flap portion open.
Figure 14:
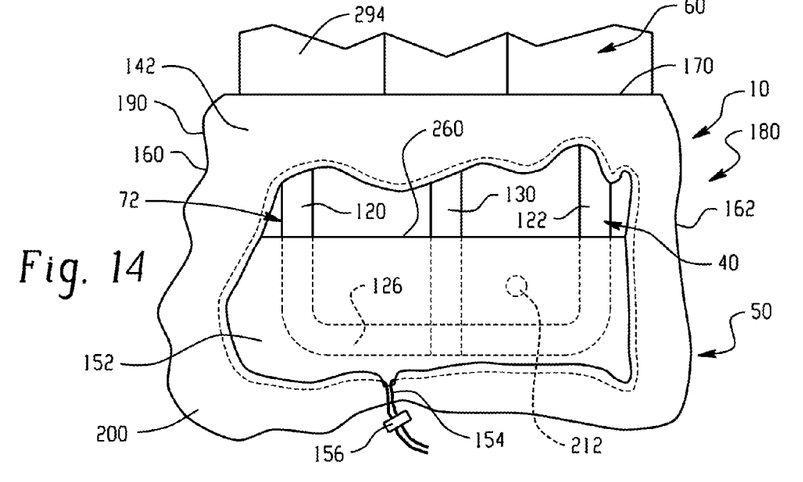

Backpack frame structure 40 includes a back frame 70 and a base frame 72 that can be pivotable relative to one another about a frame axis 76 between a folded condition 80 and an unfolded condition 82 (see FIG. 13). Frame structure 40 can be formed in any layout that produces the selective L-shape frame structure of this application without detracting from the invention of this application. In a preferred embodiment, back frame 70 in formed by spaced apart back side bars 90 and 92 that can be joined to one another by an upper back bar 100 and a lower back bar 102. Further, some or all of these bars can be formed by a single bar. In a preferred embodiment, bars 90, 92 and 100 are a single U-shaped bar. Back frame 70 extends from an inner head end 103 to a distal end 104 that is spaced from axis 76. In the embodiment shown, distal end 104 is along upper back bar 102.

The selective L-shape and the base legs of the "L" shape of the frame are formed by one or more pivots 110 fastened between back frame 70 and base frame 72. In the embodiments shown, base frame 72 is formed in a U-shape with base side bars 120 and 122 that extend outwardly from an inner base end 124 to and a base cross bar 126. The base frame also includes a distal end 128 that is spaced from base end 124 and axis 76. In the embodiment shown, distal end 128 is along base cross bar 126. Accordingly, when the blind is in a deployed condition 129, distal ends 128 and 104 rest on the ground surface thereby forming a slanted back support that will be discussed more below.

Further, the spacing between base side bars 120 and 122 can be less than the spacing between back side bars 90 and 92 wherein base frame 72 folds within back frame 70 when the frame structure is in folded condition 80. When in unfolded condition 82, base frame 72 can be at an approximately 90 degrees angle from back frame 70. In another embodiment of the invention of this application, the base frame can be slightly greater than 90 degrees from the back frame such that when the blind is deployed in the field, the base portion of the frame is less likely to collapse when being utilized by the hunter. Yet further, the pivotable connection between the back legs and the base legs can include a selective locking arrangement (not shown) to further increase the rigidity of the overall layout frame structure when deployed. While not required, the back frame structure can have a general rectangular configuration with curved corners wherein the base tube of this structure is the one joined to the base portion of the frame.

In addition, backpack assembly can include any other structural features to include strength and performance without detracting from the invention of this application. Further, while not required, the frame can be formed by tubular components that provide strength while still being lightweight. In order to further increase the strength of the system, in particular when it is being used as a backpack, backpack assembly 20 can further include one or more frame support straps 130. In the embodiments shown, strap 130 is joined between upper back bar 100 and base cross bar 126. Further, this strap can be adjustable to allow for different size and shaped loads carried in the backpack.

Bag portion 50 can have a wide range of configurations without detracting from the invention of this application. Further, its size can be based, at least in part, on the desired size of the desired hunting blind and can even be oversized to allow for the transport of large lightweight objects such as decoys. In greater detail, bag portion 50 extends from a head side 140 to a rear side 142, which are generally defined based on the position of the hunter when the hunter is using the hunting blind. Bag portion 50 further includes a bag bottom 150 that is positioned at or near head side 140 and an opposite bag opening 152 that is positioned at or near rear side 142, which will be discussed more below. Bag opening 152 can be selectively closeable by one or more means that can allow for multiple features. In this respect, bag opening can include a rope tie 154, or the like, that can include a friction latch 156 to close or at least partially close opening 152. Yet further, padded flap 60 can also close of opening 152, which will also be discussed more below. In the embodiments shown, the bag is an oversized bag wherein bag opening 152 extends past upper back bar 100. Extending between bag bottom 150 and bag opening 152 are a first side 160, a second side 162 along with an inner side 170 and an outer side 172. Again bag portion can have any configuration without detracting from the invention of this application, but the embodiments shown form a general rectangular bag arrangement.

Yet further, the bag portion of this application and other portions of this application can be formed from a wide range of materials known in the art including, but not limited to, woven and non-woven materials, polymers and other materials known in the art. In a preferred set of embodiments, the blind of this application is formed from both waterproof materials and materials that can allow for evaporation and/or drainage. The location of these materials can be based on a wide range of factors based on how the blind in used. With respect to bag portions 50, inner side 170 faces and/or engages the hunter's back when the layout blind is in the transportable condition 180 wherein inner side 170 can include a waterproof bag side layer 182 to prevent wet objects placed in bag portion 50 from making the hunter's back wet. Similarly, sides 160 and 162 can include waterproof sections 190 and 192, respectively to further help keep the hunter dry when transporting wet cargo. However, sides 160 and 162 can include one or more mesh or breathable panels 200 and 202 to help promote drying for wet objects that are stored in the bag portion. Outer side 172 can also include one or more mesh or breathable panels 210 for the same reason. In addition, to the breathable panels, bag bottom can include one or more drainage openings 212.

In order to enhance comfort for the hunter for both using the device of this application as a backpack and as a hunting blind, inner side 170 can further include a layer of padding 220 and a back support layer 222 having a back support surface 223 to support the hunter's back when the device is in use. The back support layer can be formed from a breathable material to keep the hunter's back cooler during use, while waterproof bag layer 182 can prevent moisture in the bag from reaching the hunter's back. Further, inner side 170 can include a head cushion 224 that is positioned at or near head side 140. In this configuration, head cushion 224 is oriented at the hunter's head when the device is in the deployed condition 129 and is nearer to the hunter's buttocks when the device is in the transportable condition.

Bag portion 50 and/or backpack frame structure 40 further includes shoulder or carrying straps 230 and 232. Shoulder straps 230 and 232 can be any should straps known in the art wherein they will not be discussed in greater detail in the interest of brevity. If the straps are joined directly to the bag portion, the bag portion can include one or more reinforcement panels 240 and 242.

Backpack frame structure 40 is secured relative to bag portion 50 and these components work together to form the backpack for transportable condition 180 and for the blind for the deployed condition 129. While backpack frame structure 40 can be permanently secured relative to bag portion 50, in the embodiments shown the frame is selectively removable from the bag portion wherein the frame can be removed from the fabric portions of the backpack. This can be used to allow the fabric portions of the backpack to be cleaned and even put into a clothes washer. This can be done by any means known in the art. As is shown, the bag portion can includes a base frame flap 260 that can form a base frame pocket 262 in the base fabric portion of the backpack wherein base frame 72 is configured to fit into the pocket and allows the base portion of the backpack to move with the base frame. Back frame 70 can be selectively joined to inner side 170 of the bag by a pair of inwardly extending frame flaps 270 and 272 that are secured relative to one another by a plurality of frame straps 276 extending between frame flaps 270 and 272. These can include adjustable clips 280. It is preferred that these straps extend widthwise.

Bag flap 60 also has multiple functions and features. In this respect, bag flap 60 has one function of adding comfort to the device when it is in deployed condition 129. In this respect, the hunter essentially sits or lays on flap 60 and the hunter's back can rest on backpack assembly 20, which will be discussed more below. As discussed above, backpack assembly 20 includes a padded portion 220 to increase comfort. Similarly, bag flap 60 can include a flap outer layer or surface 290 that is a waterproof layer to prevent ground moisture from soaking the hunter's clothing. Bag flap 60 can further include a flap padding layer 292 to cushion the hunter in that the blinds of this application can be deployed on a wide range of ground surfaces. Bag flap 60 can further include an inner flap layer 294 that can be a breathable layer to help prevent perspiration during use as a blind. Thus, the flap of this application is configured to both provide a cushioned sitting surface and be a moisture barrier. Bag flap 60 has a length that is great enough to provide a surface for the hunter to lay on. The length of the flap 60 is preferably greater than 20 inches. Accordingly to another embodiment, it is greater than 24 inches. In yet a more preferred embodiment, it is between 26 and 30 inches.

In addition, bag flap 60 can also be a cover for bag portion 50 to help cover bag opening 152 of the backpack when it is transportable condition. In addition, bag flap 60 can have a tie-down flap strap 300 that is securable relative to the backpack frame structure 40 and/or bag portion 50 to tighten the flap over opening 152 of the bag. Flap strap can use any clip structure 302 known in the art to fasten the strap. As can be appreciated, the additional flap covering the bag opening can help to prevent articles being transported into the field from falling out of the bag section. Yet further, as noted above, bag portion 50 can have one or more mesh or breathable panels to allow items stored therein to dry, if they are wet when they are inserted. As can be appreciated, duck decoys would likely be wet after use in the field. Thus, the flap can be used to help keep articles in the bag dry when the device is transported into the field. Then, the mesh panels on the sides of the bag can help articles in the bag to dry when the device is transported out of field. Again, these mesh surfaces can work with drainage openings 212 to further help with the removal of moisture from items stored within the bag, especially when the device is transported out of the field.

Figure 1:
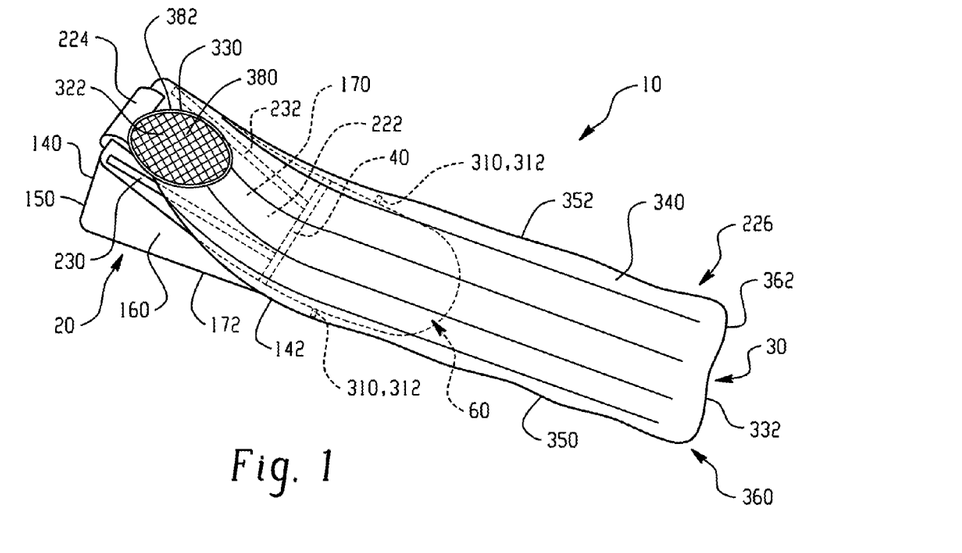
FIG. 1 is a perspective view of a backpack layout blind of this application in a deployed condition.
Figure 2:
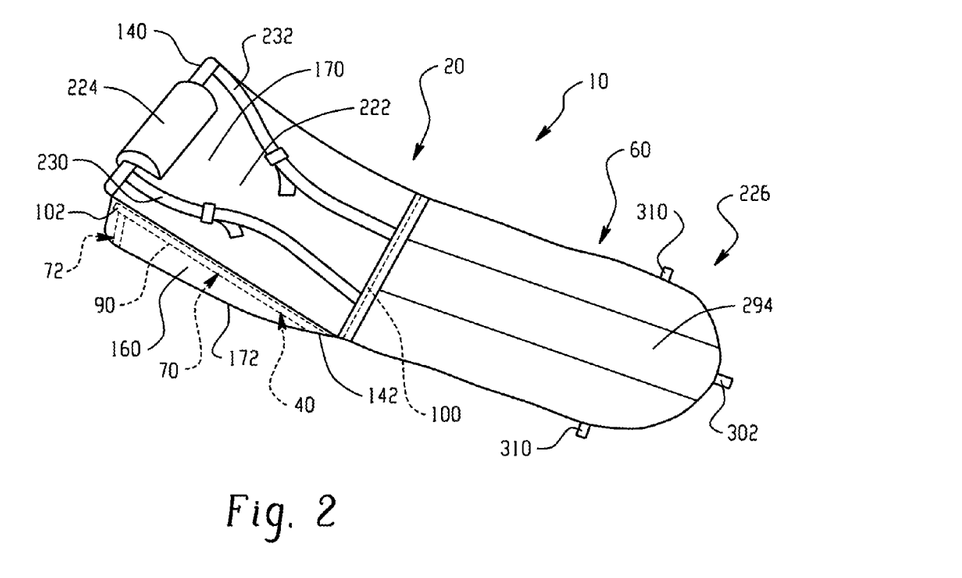
FIG. 2 is a perspective view of the backpack portion shown in FIG. 1.
Figure 3:
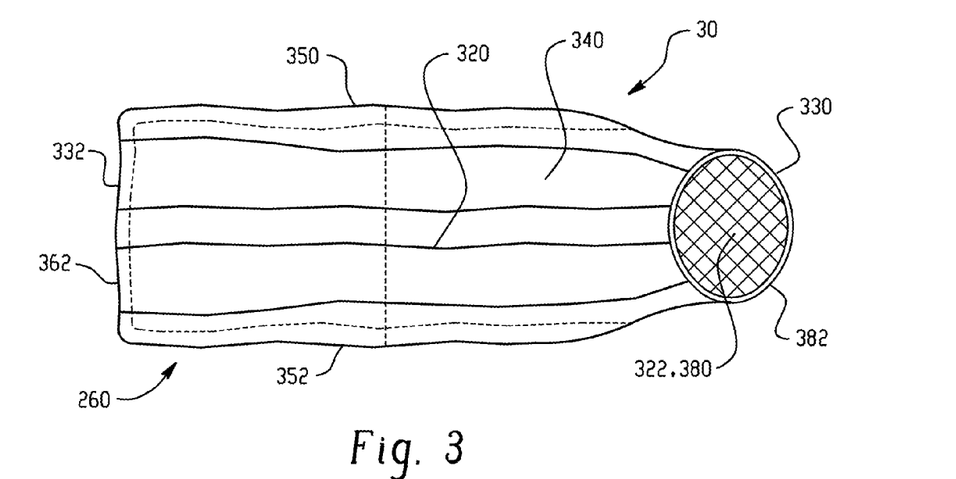
FIG. 3 is a top side view of the blind portion of the invention of this application shown in FIG. 1.
Figure 4:
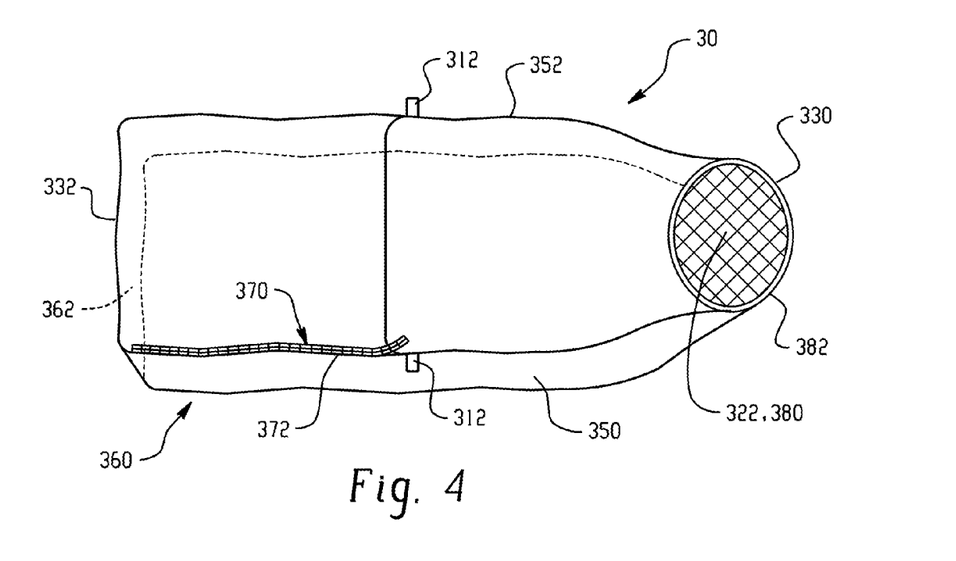
FIG. 4 is a bottom side perspective view of the blind portion shown in FIG. 1.
Figure 5:
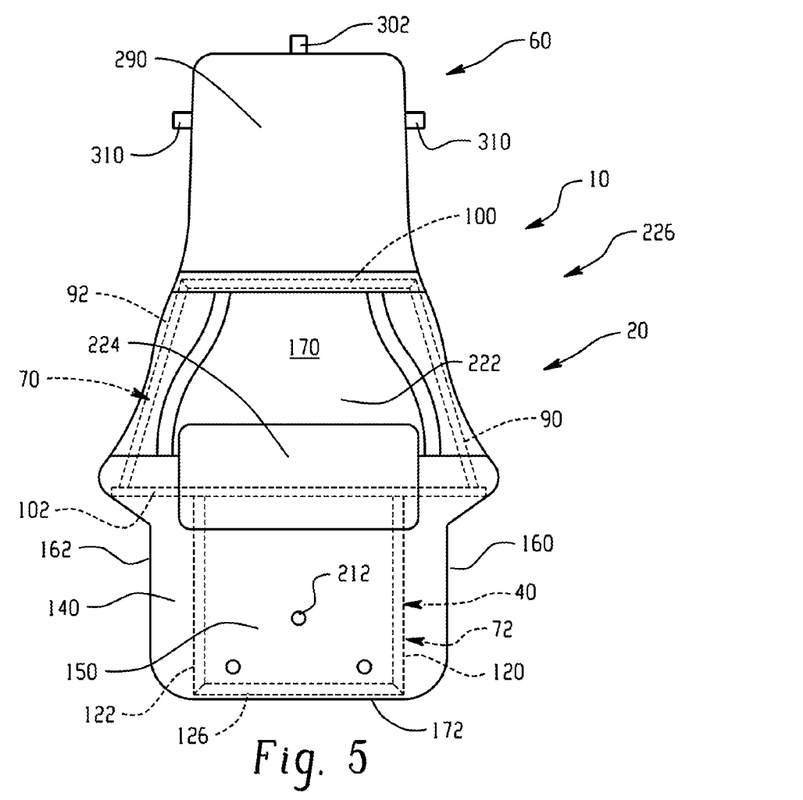
FIG. 5 is a back side of the backpack portion shown in FIG. 2.

Yet further, flap 60 can include one or more blind clips 310 that can work in connection with blind clips 312 of blind portion 30 to help maintain the device in a desired deployed condition 129 as is best shown in FIG. 1. More particularly, blind or cover portion 30 is intended to lay over top of the hunter when the hunter is in a hunting position. Thus, the hunter will rest on flap 60 and back support surface 223 of inner side 170 and will position cover or blind 30 over top of him/her after the hunter has moved into the desired hunting position. Cover 30 can include any feature known in the hunting field including, but not limited to, special prints, stubble straps 320 and viewing openings 322. In greater detail, cover 30 extends from a head end 330 to a foot end 332. Cover 30 further includes a top layer 340 that generally extends between head end 330 and foot end 332, but which can stop short of head end 330 if the cover includes viewing openings 322. Cover 30 further includes sides 350 and 352. In a preferred embodiment, cover 30 includes a foot bag 360 at or near foot end 332. Foot bag can be formed by a portion of top 340 and sides 350 and 352 along with a foot panel 362. In addition, foot bag 360 can have a selectively openable section 370 that can be utilized to help clean out the foot bag after use. It can be used to also help the hunter position the cover over top of him/her. Selectively openable section 370 can include a zippered opening 372. As discussed above, cover 30 can include any feature known in the art and the invention of this application could also include multiple covers for a single backpac wherein different covers could be utilized for different environments. Further, for colder environments, cover 30 can include an insulation layer (not shown).

With respect to viewable openings 322, this can be formed by one or more mesh portions 380 that provide a good viewable screen for the hunter. Mesh portion 380 can include an outer wire 382 that is selectively deformable to allow the hunter to form the viewing window as desired.

Figure 6:
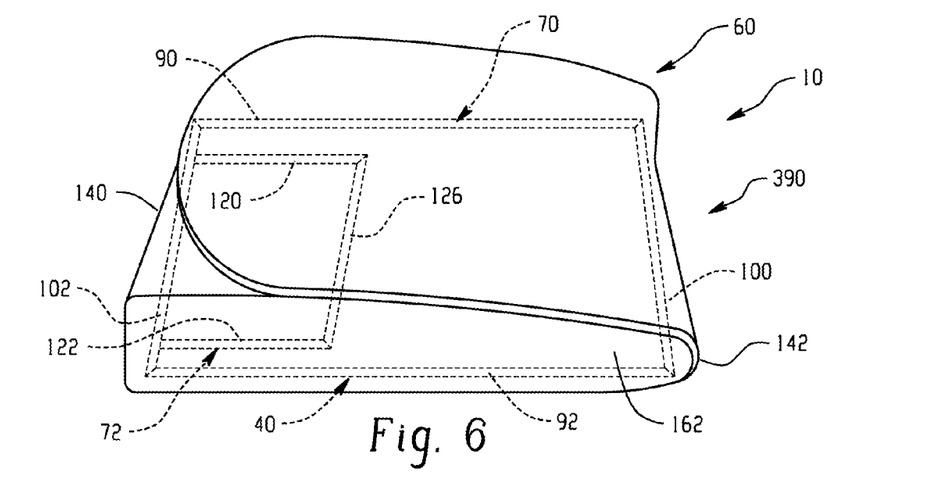
FIG. 6 is a side elevational view of the backpack portion shown in a collapsed or storable condition.
Figure 7:
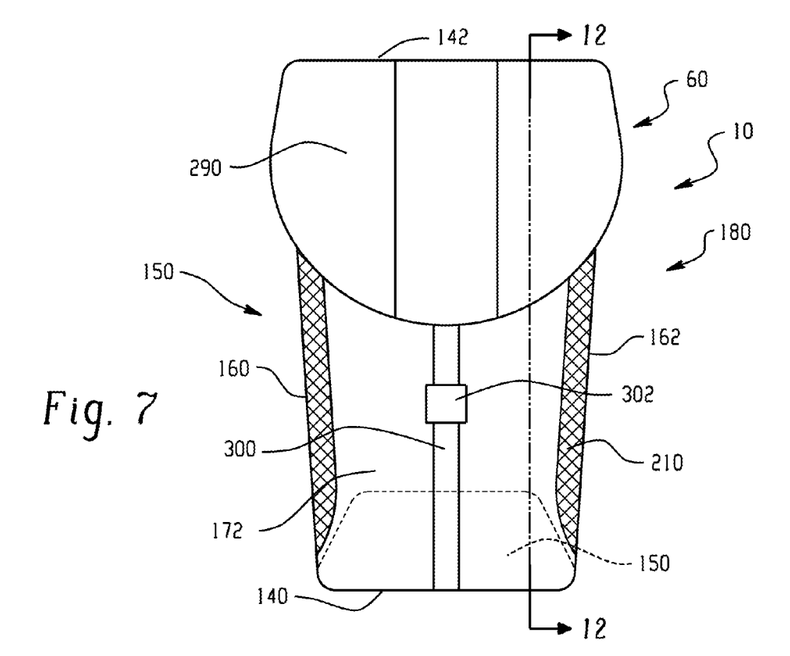
FIG. 7 is a front elevational view of the backpack portion shown in a transportable condition.
Figure 8:
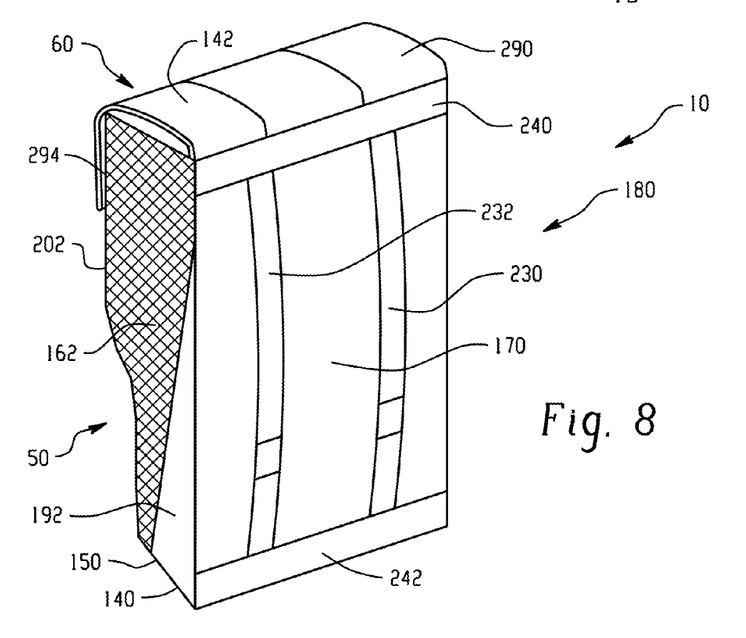
FIG. 8 is a back, side perspective view of the backpack portion shown in a transportable condition.
Figure 9:
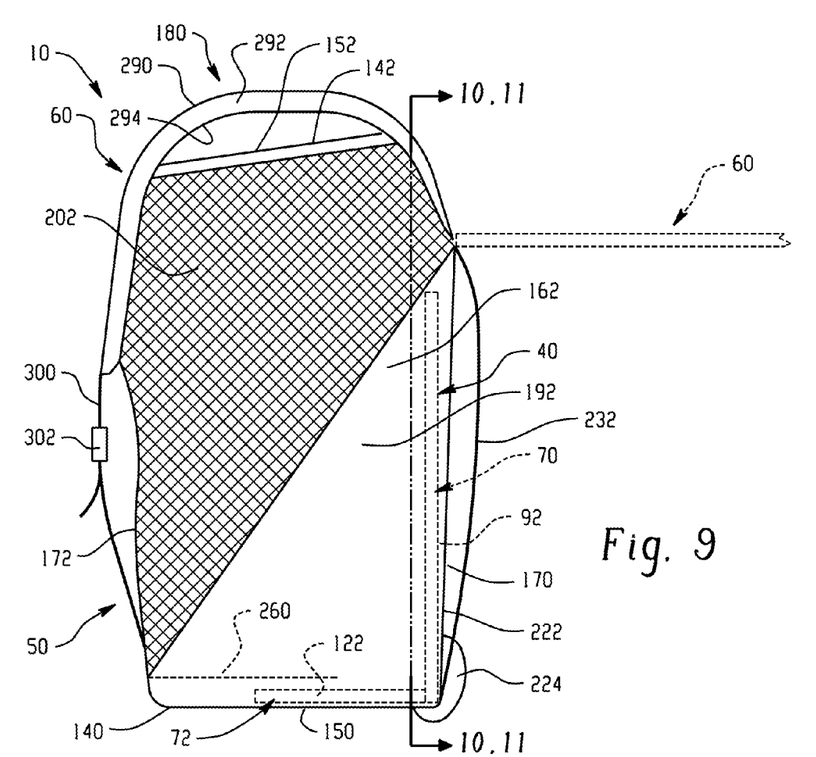
FIG. 9 is a side elevational view of the of the backpack portion shown in a transportable condition.
Figure 10:
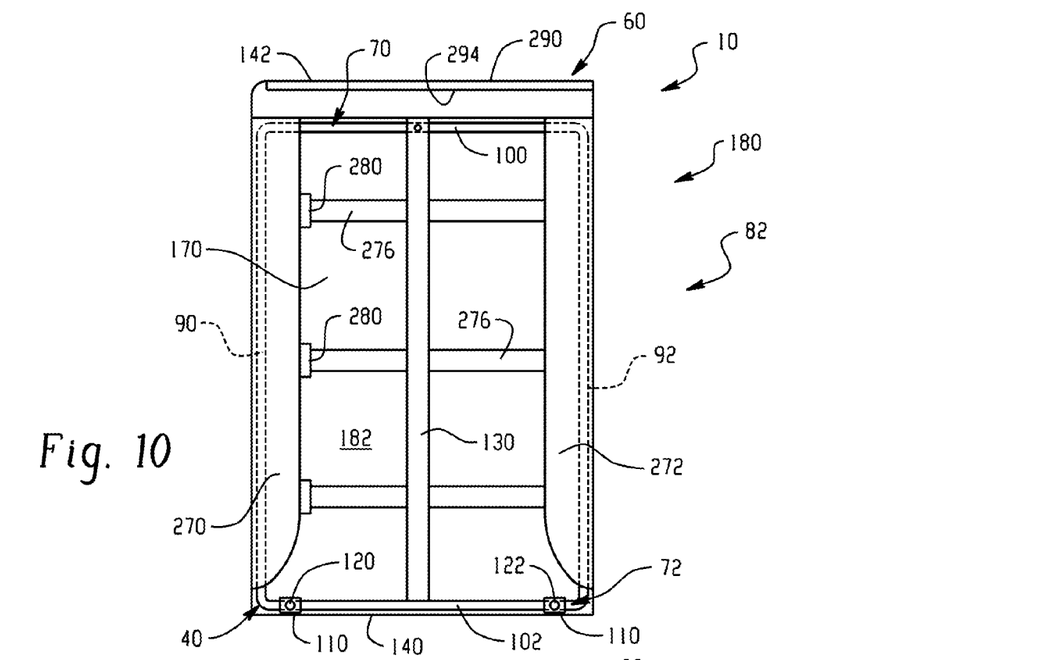
FIG. 10 is a sectional view taken along lines 10-10 in FIG. 9.
Figure 11:
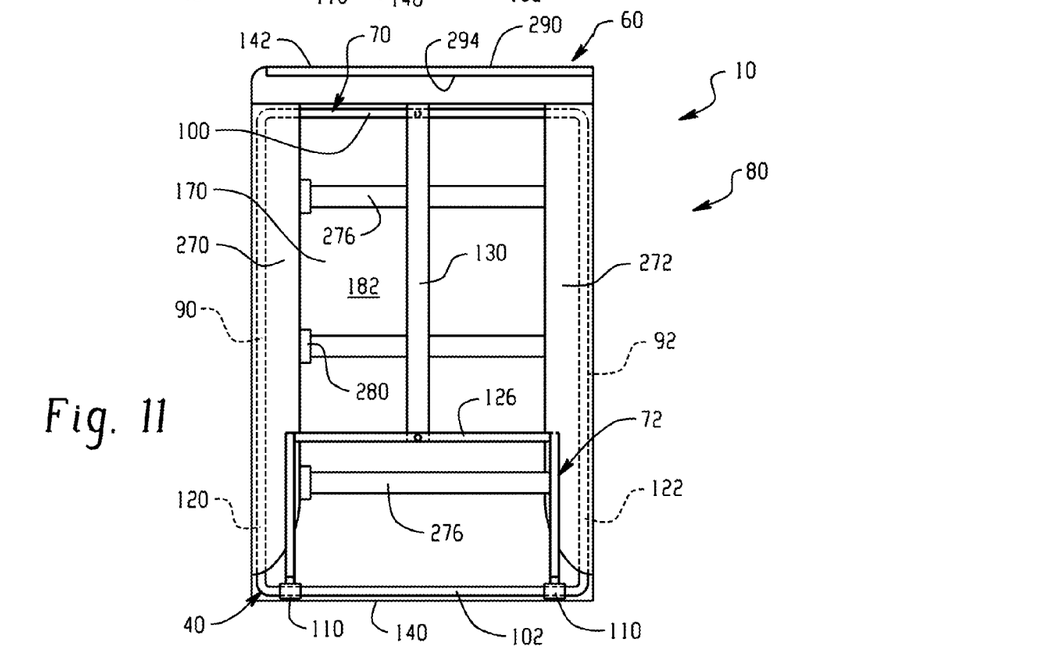
FIG. 11 is a sectional view taken along lines 11-11 in FIG. 9.
Figure 12:
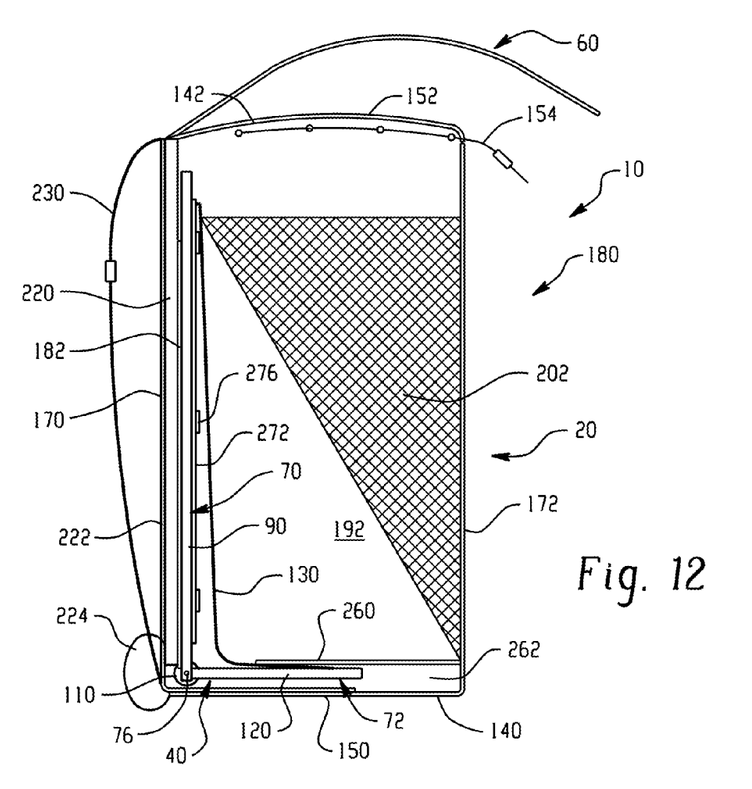
FIG. 12 is a sectional view taken along lines 12-12 in FIG. 7.

FIG. 6 shows the hunting blind of this application in a storable condition 390 wherein the cover portion 30 is stored within bag portion 50 of backpack assembly 20. In this condition, the L-shaped frame of the backpack is collapsed such that base frame 72 are rotated about axis 76 until it is within back frame 90, which produces a compact storable blind that is less than about five inches thick and about twenty inches by thirty inches square. As can be appreciated, this backpack-style hunting blind could be easily stored in the off-season by the hunter without taking up much space. Yet further, it can be easily transformed from the storable condition to the transportable condition.

In operation, when the blind is to be used, the hunter unfolds the hunting blind from the collapsed condition shown in FIG. 6 by rotating base frame 72 about axis 76 until it is at a generally 90 degree angle with back frame 90 such that the device is in transportable condition 180. In this condition, the hunter can load hunting items, such as decoys, into bag portion 50. Once the desired items are in the bag portion, bag opening 152 can be closed by rope tie 154 and friction latch 156. In addition, padded flap 60 can be clipped over opening 152 by flap strap 300 and flap clip 302. Then, the hunter can use backpack shoulder straps 230 and 232 to carry the device and supplies on his/her back.

Once in a desired hunting location, the hunter can remove the articles from the bag and begin to set the blind up. In this respect, the frame is unfolded to unfolded condition 82 and rotated such that distal ends 128 and 104 rest on the ground surface and back support surface 223 faces upwardly, but at an angle. This forms the slanted back support that will provide a comfortable layout hunting position for the hunter. Padded flap 60 is then oriented such that it extends away from rear side 142 of the bag and forms a layout pad. When in the deployed condition, the bag bottom is actually at the head end of the layout blind. The hunter can then move into the desired laying position on back support surface 223 and padded flap 60. After that is completed, cover 30 can be moved in position. If desired, the hunter can also use clips 310 and 312 to maintain a desired cover orientation. The hunter then moves viewable opening 332 as desired wherein the blind is now in deployed condition 129. To remove the blind from the field, the hunter reverses these operations and can easily carry his/her gear and any game from the field by placing it in the bag portion. If the bag or blind is dirty after hunting and the transportation of game, the hunter can remove the fabric layers from the frame and wash them in a clothes washer.

Again, the blind of this application provide both an effective means for carrying supplies and other items into and out of the field. Further, it provide a comfortable layout structure wherein the hunters buttocks and upper thighs rest on the padded flaps, while the hunter's back, neck and head rest on the padded and inclined inner side Yet further, the invention of this application can include head cushion 224 to the hunter's head. In that the frame structure of the backpack portion is positioned on the sides of the inclined portion, the inclined portion becomes a floating seat portion wherein the hunter's back does not directly engage the backpack frame structure. This has been found to produce a more comfortable layout blind that can be comfortably used for many hours. Yet further, the included back portion can further include separable lumbar and/or additional head/neck supports (not shown). These and other features could be securable to the inner side by the use of VELCRO or other similar attaching systems. Further, when in the transportable condition, these items could be transported in the storage bag of the device of this application.

The invention of this application is a combination of a backpack configured layout blind and a bag structure that can be used to transport supplies into the field that is used in combination with a blind structure that can be a separate blind structure. As is shown in the figures, even though the layout blind of this application can be compactly stored, it includes a large bag portion that can be utilized to transport a significant number of decoys and other items into the field. Yet further, the bag portion of the blind of this application can also transport the outer cover or blind into the field and can be used to store the cover when the blind is not in use. The bag portion has a large opening to allow easy access to the bag.

As a result, the invention of this application is both highly transportable and functional when transported into and out of the field. Even with this highly transportable configuration, the device of this application is also an effective hunting blind and allows the device to be deployed in even the most remote locations. Yet further, the unique frame design of the invention of this application allows the blind to be compactly stored when the device is not in use.

While considerable emphasis has been placed on the preferred embodiments of the invention illustrated and described herein, it will be appreciated that other embodiments and equivalences thereof, can be made and that many changes can be made in the preferred embodiment without departing from the principals of the invention. Furthermore, the embodiment described above can be combined to form yet other embodiments of the intention of this application. Accordingly, it is to be distinctly understood that the foregoing descriptive matter is to be interpreted merely as illustrative of the invention and not as a limitation.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed.

It is claimed:

1. A portable layout hunting blind that easy to transport into the field and easy to deploy in the field between a transportable condition and a deployed condition, the portable layout blind comprising a backpack assembly and a separate covering blind, the backpack assembly including a bag portion and a frame, the bag portion having at least one storage compartment to store associated gear including an upper storage compartment having a top bag opening, the top bag opening having a frame side portion and an opposite front side portion with side portions extending therebetween, the frame having a back frame portion extending between a head end and a back frame distal end that is opposite of the head end and the back frame distal end extending toward the frame side portion of the bag top opening, the frame further including a base frame portion attached relative to the back frame at least near the head end and the base frame being generally perpendicular to the back frame such that the frame has an L-shaped configuration, the base frame extending from a proximal base end to a base frame distal end, when in a transportable condition, the back frame portion engaging the back of an associated hunter and when in a deployed condition the back frame distal end and the base frame distal end are configured to rest on an associated ground surface wherein the back frame portion forms a slanted back support for an associated hunter to lay on the layout hunting blind when in the deployed condition, the bag portion having an inner bag side adjacent the back frame and an opposite front side, the bag portion further including a bottom portion adjacent the base frame wherein the frame is a backpack frame when in the transportable condition and the top bag opening faces upwardly, the backpack assembly further including a padded top flap, the padded top flap being secured on a frame side of the top opening and having a pad distal end defining a pad length and having a top flap width to cover the top bag opening from the frame side to the front side portion of the top opening when in the transportable condition, the padded top flap configured such that the pad distal end extends away from the bag portion and the frame when in the deployed condition to provide a layout pad adjacent to the slanted back support, the backpack assembly further including a pair of shoulder straps extending along the slanted back support, the separate covering blind configured to lay over the associated hunter independent of the frame when in the deployed condition.

2. The portable layout hunting blind of claim 1, wherein the pad length is greater than 24 inches and the padded top flap is extendable down a portion of the front side when in the transportable condition.

3. The portable layout hunting blind of claim 2, wherein the pad length is between 26 and 30 inches and provides a padded support for the associate hunter's buttocks, hips and thighs.

4. The portable layout hunting blind of claim 1, wherein the back frame extends inside the bag portion and the slanted back support is a section of the inner bag side.

5. The portable layout hunting blind of claim 4, wherein the slanted back support is padded.

6. The portable layout hunting blind of claim 5, wherein the slanted back support includes at least two layers, the at least two layer including an inner waterproof layer and a padding layer, the inner waterproof layer separating the padding layer and an inside of the bag.

7. The portable layout hunting blind of claim 5, wherein the slanted back support includes a head cushion at the head end.

8. The portable layout hunting blind of claim 1, wherein the covering blind extends from a head end to a foot end, the covering blind including a top layer that includes viewing opening, the viewing opening having an outer wire that is selectively deformable to allow the shape of the viewing window to be altered.

9. The portable layout hunting blind of claim 8, wherein the covering includes a foot bag at or near foot end.

10. The portable layout hunting blind of claim 9, wherein the foot bag includes selectively openable section that can be utilized to help clean out the foot bag after use.

11. The portable layout hunting blind of claim 1, wherein the base frame portion is pivotably attached relative to the back frame such that the base frame pivots about a frame axis at least near the head end, the base frame pivoting between the L-shaped configuration and a generally flat configuration.

12. The portable layout hunting blind of claim 11, wherein the back frame includes a pair of parallel extending back side bars that extend between the head end and the back frame distal end and being spaced from one another by a back side bar spacing, the base frame includes a pair of parallel extending base side bars that extend between the inner base end and the base frame distal end and are spaced from one another by a base side bar spacing, the base side bar spacing being unequal to the back side bar spacing such that the base side bars and the back side bars are general parallel to one another when in the general flat condition.

13. The portable layout hunting blind of claim 1, wherein the bag portion includes side wall having mesh opening and the bag bottom side includes at least one drainage opening.

* * * * *